(12) United States Patent
Watfa et al.

(10) Patent No.: US 9,084,093 B2
(45) Date of Patent: Jul. 14, 2015

(54) METHOD AND APPARATUS FOR CONTROLLING THE APPLICATION OF SELECTED IP TRAFFIC OFFLOAD AND LOCAL IP ACCESS

(75) Inventors: Mahmoud Watfa, Saint Leonard (CA); Pascal M. Adjakple, Great Neck, NY (US); Kai Liu, S. Huntington, NY (US); Saad Ahmad, Montreal (CA); Ulises Olvera-Hernandez, Kirkland (CA); Peter S. Wang, E. Setauket, NY (US)

(73) Assignee: InterDigital Patent Holdings, Inc., Wilmington, DC (US)

( * ) Notice: Subject to any disclaimer, the term of this patent is extended or adjusted under 35 U.S.C. 154(b) by 0 days.

(21) Appl. No.: 13/439,611

(22) Filed: Apr. 4, 2012

(65) Prior Publication Data

US 2012/0275310 A1 Nov. 1, 2012

Related U.S. Application Data

(60) Provisional application No. 61/471,489, filed on Apr. 4, 2011.

(51) Int. Cl.
*H04L 12/26* (2006.01)
*H04W 8/08* (2009.01)

(52) U.S. Cl.
CPC ..................................... *H04W 8/082* (2013.01)

(58) Field of Classification Search
None
See application file for complete search history.

(56) References Cited

U.S. PATENT DOCUMENTS

| | | | | |
|---|---|---|---|---|
| 2004/0018841 | A1* | 1/2004 | Trossen | 455/436 |
| 2011/0045834 | A1 | 2/2011 | Kim et al. | |
| 2011/0170469 | A1* | 7/2011 | Watfa et al. | 370/312 |
| 2011/0170517 | A1* | 7/2011 | Bakker et al. | 370/331 |
| 2011/0171953 | A1* | 7/2011 | Faccin et al. | 455/426.1 |
| 2012/0039304 | A1* | 2/2012 | Kim et al. | 370/332 |
| 2012/0039323 | A1* | 2/2012 | Hirano et al. | 370/338 |
| 2012/0170454 | A1* | 7/2012 | Takano et al. | 370/230 |
| 2012/0177005 | A1* | 7/2012 | Liang et al. | 370/331 |
| 2012/0213199 | A1 | 8/2012 | Zembutsu et al. | |
| 2012/0300750 | A1* | 11/2012 | Chin et al. | 370/331 |
| 2013/0188604 | A1* | 7/2013 | Chin et al. | 370/331 |

FOREIGN PATENT DOCUMENTS

GB 2472866 2/2011

OTHER PUBLICATIONS

Research in Motion UK Ltd., Verizon Wireless, Vodafone, "Notify UE When a HeNB Provides Access to a Residential/Enterprise IP Network," C1-110784, 3GPP TSG-CT WG1 Meeting #69, Ljubljana, Slovenia, Jan. 24-28, 2011.

(Continued)

*Primary Examiner* — Otis L Thompson, Jr.
(74) *Attorney, Agent, or Firm* — Volpe and Koenig, P.C.

(57) ABSTRACT

A method and apparatus are described for controlling the application of Selected Internet Protocol (IP) traffic offload (SIPTO) or Local IP Access (LIPA) services for a wireless transmit/receive unit (WTRU). The SIPTO and LIPA services may be performed over packet data network (PDN) connections. A user of the WTRU may be prompted to accept or reject the usage of the SIPTO or LIPA services. The user of the WTRU may request switching from SIPTO or LIPA services to non-SIPTO or non-LIPA services.

11 Claims, 9 Drawing Sheets

(56) References Cited

OTHER PUBLICATIONS

Third Generation Partnership Project, "Technical Specification Group Services and System Aspects; Local IP Access and Selected IP Traffic Offload (LIPA-SIPTO) (Release 10)," 3GPP TR 23.829 v10.0.0, Mar. 2011.

Third Generation Partnership Project, "Technical Specification Group Services and System Aspects; Local IP Access and Selected IP Traffic Offload (LIPA-SIPTO) (Release 10)," 3GPP TR 23.829 v10.0.1, Oct. 2011.

Third Generation Partnership Project, "Technical Specification Group Services and System Aspects; Study on Continuity of Data Sessions to Local Networks (Release 12)," 3GPP TR 22.896 V12.0.0 (Dec. 2011).

Third Generation Partnership Project, "Technical Specification Group Services and System Aspects; Service requirements for Home Node B (HNB) and Home eNode B (HeNB) (Release 9)," 3GPP TS 22.220 V9.6.0 (Mar. 2011).

Third Generation Partnership Project, "Technical Specification Group Services and System Aspects; Service requirements for Home Node B (HNB) and Home eNode B (HeNB) (Release 9)," 3GPP TS 22.220 V9.8.0 (Dec. 2011).

Third Generation Partnership Project, "Technical Specification Group Services and System Aspects; Service requirements for Home Node B (HNB) and Home eNode B (HeNB) (Release 10)," 3GPP TS 22.220 V10.6.0 (Mar. 2011).

Third Generation Partnership Project, "Technical Specification Group Services and System Aspects; Services and System Aspects; Service Requirements for Home Node B (HNB) and Home eNode B (HeNB) (Release 10)," 3GPP TS 22.220 V10.8.0 (Dec. 2011).

Third Generation Partnership Project, "Technical Specification Group Services and System Aspects; Service Requirements for Home Node B (HNB) and Home eNode B (HeNB) (Release 11)," 3GPP TS 22.220 V11.0.0 (Jan. 2010).

Third Generation Partnership Project, "Technical Specification Group Services and System Aspects; Service Requirements for Home Node B (HNB) and Home eNode B (HeNB) (Release 11)," 3GPP TS 22.220 V11.4.0 (Dec. 2011).

* cited by examiner

METHOD AND APPARATUS FOR CONTROLLING THE APPLICATION OF SELECTED IP TRAFFIC OFFLOAD AND LOCAL IP ACCESS

CROSS REFERENCE TO RELATED APPLICATIONS

This application claims the benefit of U.S. Provisional Application No. 61/471,489, filed Apr. 4, 2011, the content of which is hereby incorporated by reference herein.

BACKGROUND

Selected Internet Protocol (IP) traffic offload (SIPTO) is a method to offload traffic from a wireless communication system operator's core network (CN) to a defined IP network that is close to a point of attachment to the access point of a wireless transmit receive unit (WTRU). The traffic may be offloaded to another path based on the geographical (or topological in terms of IP) location of a WTRU. Thus, a goal of SIPTO is to offload some of the IP traffic from traversing nodes at the CN. Local IP Access (LIPA) is a method for providing access for IP-capable WTRUs that are connected via a H(e)NB (for example, using H(e)NB radio access) to other IP capable entities in the same residential or enterprise IP network. Traffic for LIPA typically does not traverse the mobile operator's network except for accessing particular information at the H(e)NB. A packet data network (PDN) connection established for the WTRU may be used for SIPTO and/or LIPA without the WTRU being aware of the use of SIPTO and/or LIPA.

Currently, there are no defined methods for presenting a user with the option of accepting or declining SIPTO and/or LIPA service. Further, there are no methods for controlling the establishment of PDN connections that may provide SIPTO and/or LIPA service based on a user selection of these options. Moreover, there are no defined methods to allow a user to indicate to the network that a current SIPTO and/or LIPA service is not acceptable from a quality of service (QoS) perspective. Thus, a user is currently unable to request that the network provides traffic that is offloaded via a new point or request that the network stops offloading traffic completely. Accordingly, it would be desirable to define methods to allow a user to control SIPTO and/or LIPA services.

SUMMARY

A method and apparatus are described for controlling the application of Selected Internet Protocol (IP) traffic offload (SIPTO) or Local IP Access (LIPA) services for a wireless transmit/receive unit (WTRU). The SIPTO and LIPA services may be performed over packet data network (PDN) connections. A user of the WTRU may be prompted to accept or reject the usage of the SIPTO or LIPA services. The user of the WTRU may request switching from SIPTO or LIPA services to non-SIPTO or non-LIPA services.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

Figure 1A:
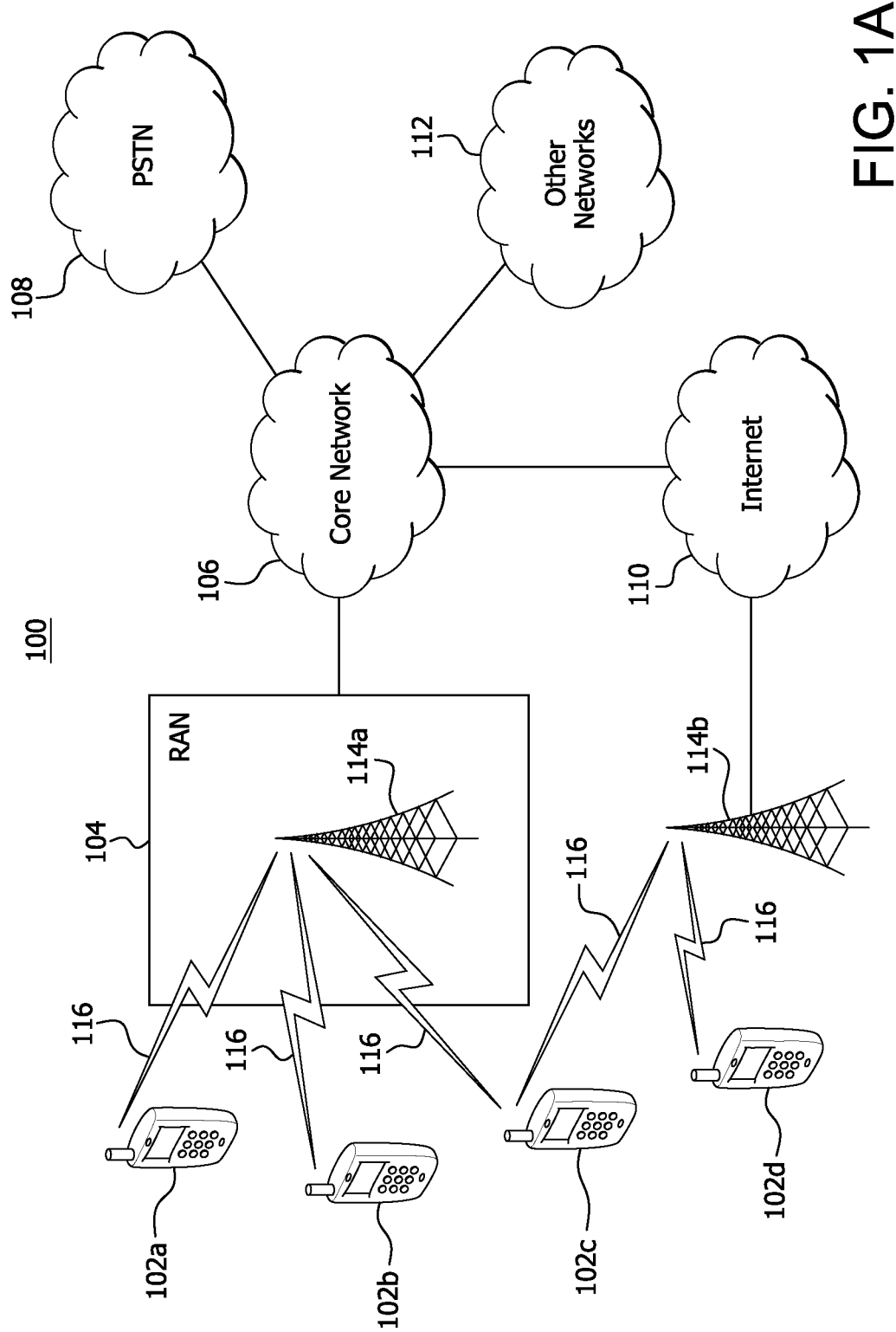
FIG. 1A shows an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
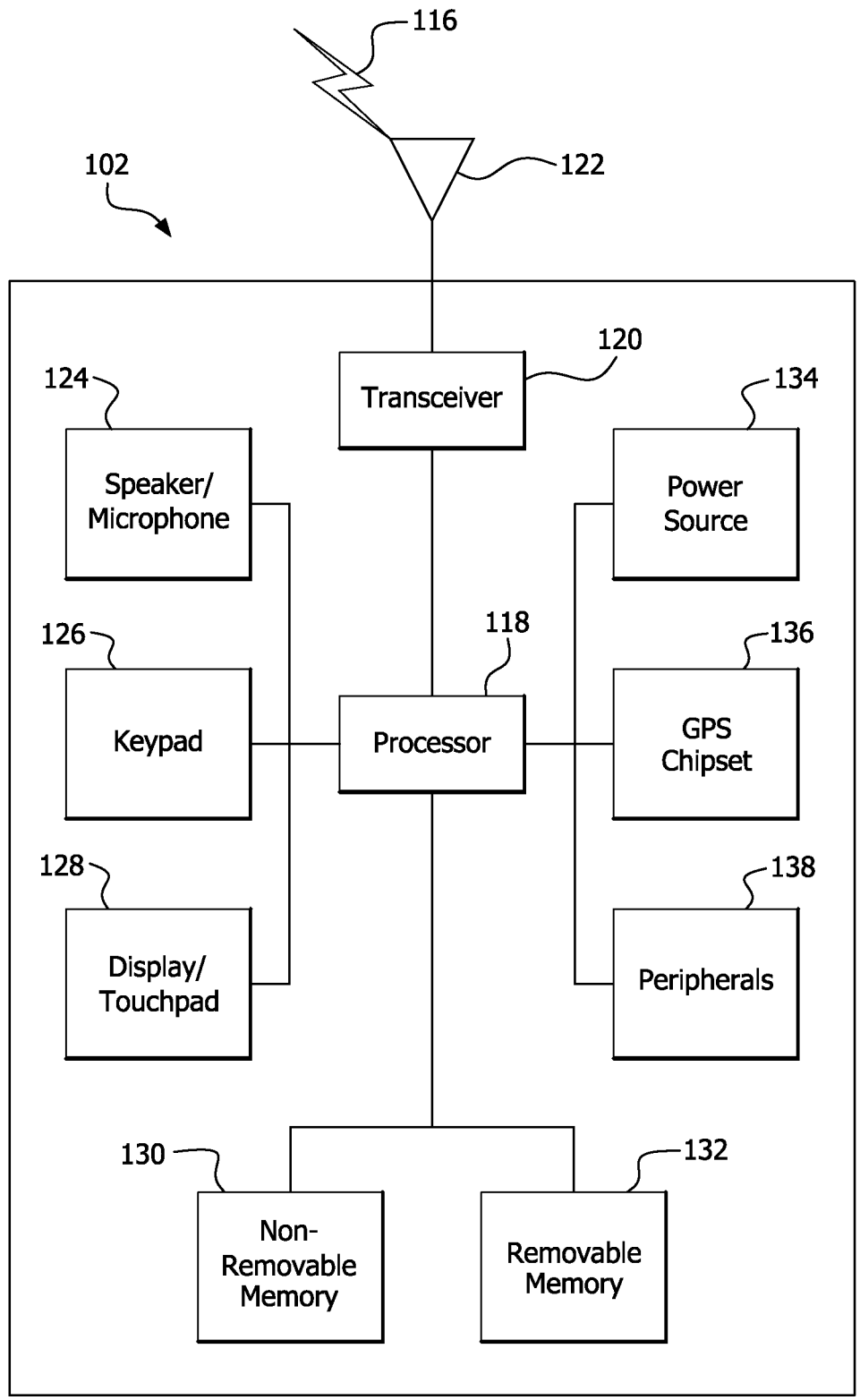
FIG. 1B shows an example wireless transmit/receive unit (WTRU) that may be used within the communications system shown in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
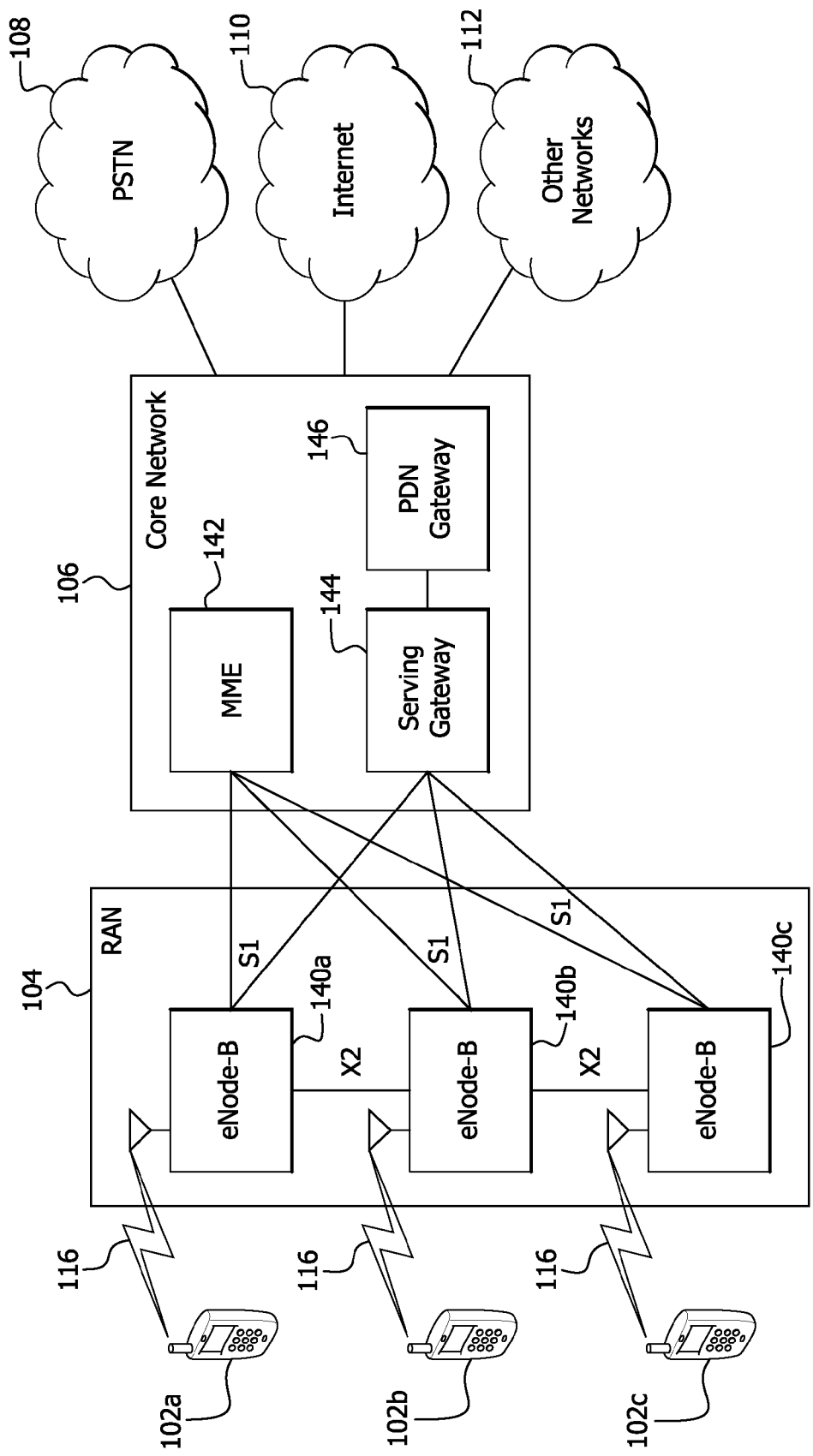
FIG. 1C shows an example radio access network and an example core network (CN) that may be used within the communications system shown in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may be configured to perform SIPTO or LIPA services. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Selected Internet protocol (IP) traffic offload (SIPTO) and local IP access (LIPA) services may be provided in any type of network and may use any type of radio access technology. For example, SIPTO and LIPA may be used in a universal mobile telephone system (UMTS) terrestrial radio access network (UTRAN) as well as an LTE network. The architecture used for SIPTO and LIPA in a UTRAN or LTE network may be similar. Accordingly, although descriptions herein may refer to a particular technology, the descriptions are for exemplary purposes only and one skilled in the art will appreciate that the descriptions may be applied to any technology capable of using SIPTO or LIPA services.

As described above, SIPTO is a method to offload traffic from a CN to a defined IP network. When reference is made to a core network with respect to the data plane, the nodes under consideration may include the serving gateway (S-GW) and the packet data network (PDN) gateway (P-GW) in, for example, an LTE-compliant system, or the serving general packet radio service (GPRS) support node (SGSN) and gateway GPRS support node (GGSN) in a UTRAN, although the disclosure herein is not limited to any one network architecture or technology. SIPTO may require that a WTRU processes both offloaded traffic and non-offloaded (non-SIPTO) traffic that goes through the operator's network. SIPTO may be used in, for example, a UTRAN, an evolved UTRAN (E-UTRAN), and/or a macro cell with a home eNodeB (HeNB), for example.

Figure 2:
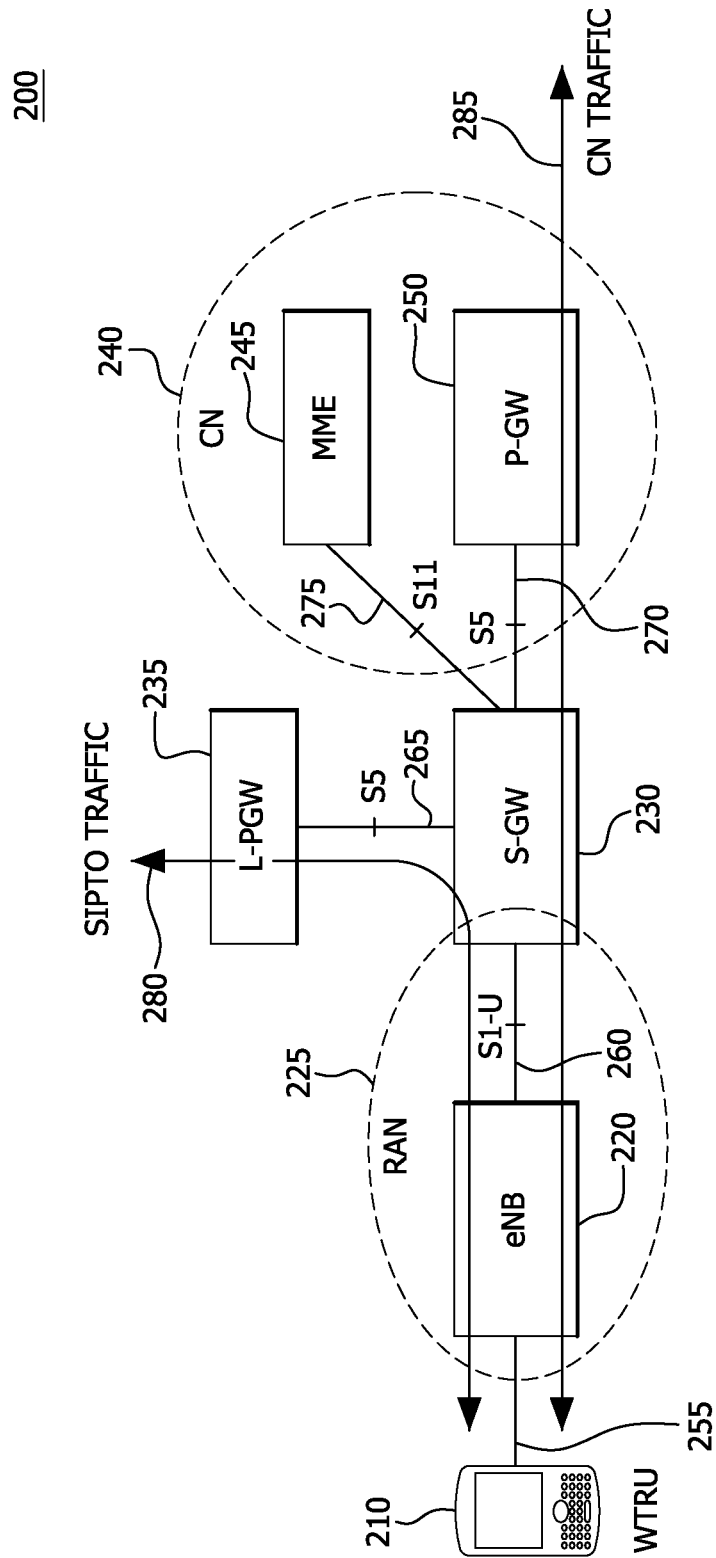
FIG. 2 is an example architecture of a wireless network configured to perform Selected IP Traffic Offload (SIPTO)

FIG. 2 shows an example wireless network 200 configured to provide SIPTO services. The network 200 includes a WTRU 210 in communication with an eNB 220 that is located in a radio access network (RAN) 225. The eNB 220 is also in communication with a S-GW 230, which is also in communication with a local packet gateway (L-PGW) 235 and a core network (CN) 240. The CN 240 includes an MME 245 and a packet data network (PDN) gateway (P-GW) 250.

The WTRU 210 communicates with the eNB 220 over a wireless air interface 255. The eNB 220 also communicates with the S-GW 230 over an S1-U interface 260. The S-GW 230 communicates with the L-PGW 235 over an S5 interface 265, and with the P-GW 250 over an S5 interface 270. The S-GW 230 also communicates with the MME 245 over an S11 interface 275. Two traffic streams are also shown, a SIPTO traffic stream 280 that is routed through the S-GW 230 to the L-PGW 265, and a CN traffic stream 285 that is routed through the S-GW 230 to the P-GW 250 in the CN 240.

The eNB 220 may also be a HeNB configured to perform SIPTO in a home network of the user of the WTRU 210. In that case, traffic may be offloaded locally to a user's home network. The home network may be an IP network that is connected to other devices such as a printer, a television, and a personal computer, for example. These nodes on the home network may be using private addressing.

Also, the wireless network 200 may be configured to provide Local IP Access (LIPA). While many of the features disclosed herein are described with regard to SIPTO, they may also be applied to LIPA and SIPTO systems for HeNBs. For example, SIPTO or LIPA may include single or multiple PDN connections, deployment behind network address translation (NAT), and the like.

Furthermore, for traffic going through the mobile operator's core network, the S-GW 230 user plane functions may be located within the CN 240. Also, mobility management signalling between a WTRU 210 and the network may be handled in the CN 240. Session management signalling, such as bearer setup for LIPA or SIPTO traffic, and traffic going through the CN 240 may terminate in the CN 240. Also, reselection of a WTRU's offload point for SIPTO traffic that is geographically or topologically close to the WTRU 210 may be possible during idle mode mobility procedures.

The SIPTO system may include a local gateway (L-GW) that is close to a WTRU's point of attachment to the access network. The L-GW may perform IP traffic offload based on some policy or configuration, for example, based on the IP address destination. IP traffic may go through the L-GW rather than through the operator's core network via, for example, a S-GW and a P-GW or via an SGSN and a GGSN (not shown).

Depending on the network technology, a local break point or local gateway may be in the HeNB subsystem or in a radio network controller (RNC). Also, the SGSN may be responsible for both control and user planes in some networks, while the user and control planes may be taken care of by a MME and a S-GW in others.

A L-GW, such as the L-PGW 235, may have certain functionalities of a PDW/GGSN. For example, the L-GW may have the following functionalities: IP address allocation; direct tunneling with the RAN 225 in connected mode; per WTRU policy-based packet filtering; or rate policing/shaping. In order to perform SIPTO transfers to a network, such as a local network or Intranet, for example, a proper PDN connection may be required. A WTRU may set an access point name (APN) to a specific value when requesting a PDN connection or when requesting the establishment of a packet data protocol (PDP) context.

Figure 3:
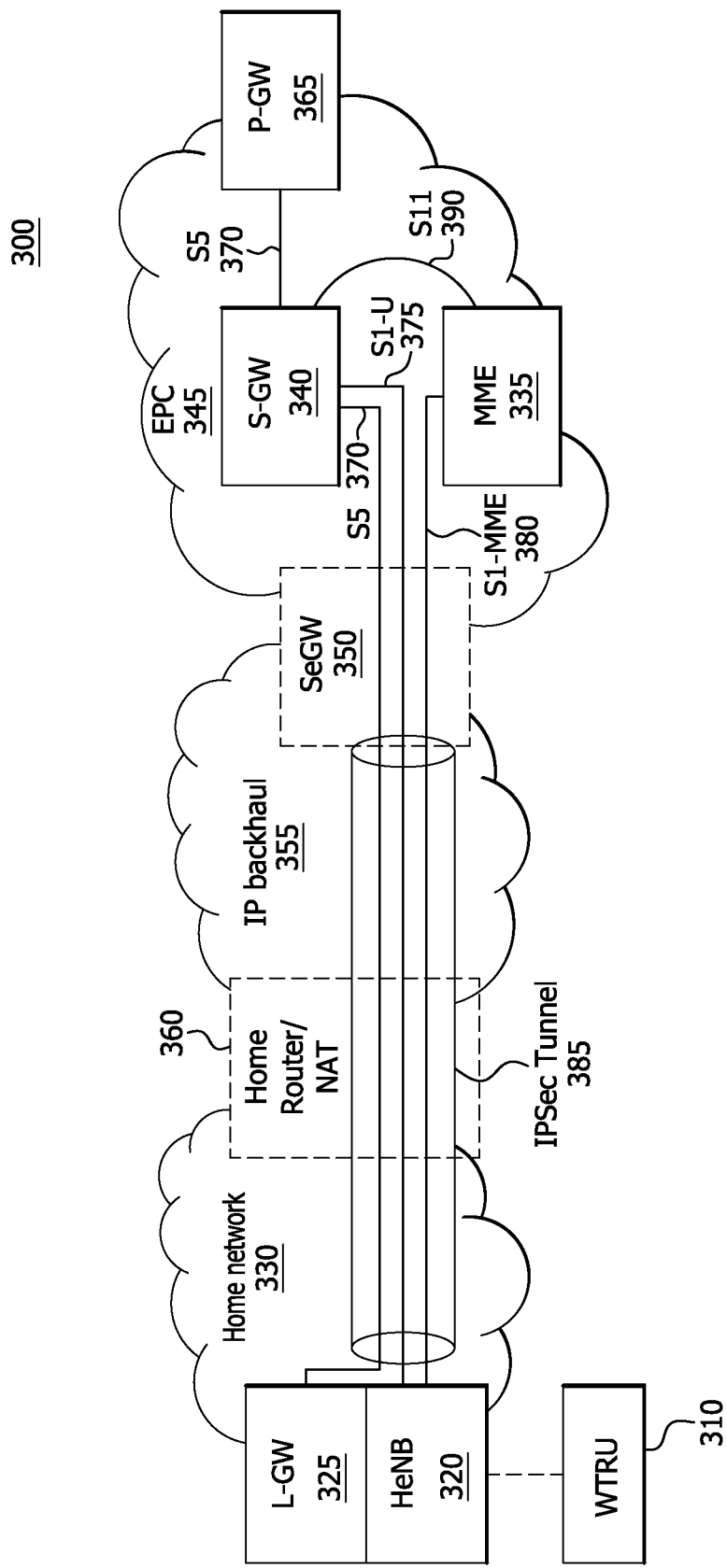
FIG. 3 shows an example wireless network configured to provide Local IP Access (LIPA) services.

FIG. 3 shows an example wireless network 300 configured to provide LIPA services. The system includes a WTRU 310 in communication with a HeNB 320. The HeNB 320 may be collocated with a L-GW 325. The HeNB 320 and the L-GW 325 may be located at a home network 330. A MME 335 and a S-GW 340 may be located at the Evolved Packet Core (EPC) 345. A Security Gateway (SeGW) 350 may be located at the edge of an operator's core network. The SeGW 350 may maintain a secure connection with the HeNB 320 across an IP backhaul network 355. A Home Router/NAT device 360 may be located at a boundary of the home network 330 and the IP backhaul network 355. A P-GW 365 is also shown.

The L-GW 325 may communicate with the S-GW 340 over an S5 interface 370. The WTRU 310 may be paged by sending a packet (for example, a downlink user packet or any other packet) to the L-GW 325 over the S5 interface 370. Downlink user packets may be buffered in the L-GW 325. Packets buffered at the L-GW 325 may be forwarded to the HeNB 320 over a direct link. The HeNB 320 may communicate with the S-GW 340 over an S1-U interface 375. Packets buffered at the S-GW 340 may be forwarded to the HeNB 320 over the S1-U interface 375. The MME 335 may communicate with the HeNB 320 over an S1-MME interface 380. Communications over the S5 interface 370, the S1-U interface 375, and the S1-MME interface 380 may be tunneled via an IPSec Tunnel 385.

To perform mapping of enhanced radio access bearer (E-RAB) IDs at the HeNB 320 with the Evolved Packet System (EPS) Bearer IDs at the L-GW 325, the S5 interface 370 P-GW tunnel endpoint identifier (TEID) (user plane) parameter may be used as correlation information. For example, it may be signaled across the S1-MME interface 380 to the HeNB 380. Candidate messages may include an INITIAL CONTEXT SETUP REQUEST, an E-RAB SETUP REQUEST, or the like. IKEv2 mechanisms may be used to request one IP address each for the HeNB 320 and the L-GW 325 function. The assigned L-GW address may be signaled to the MME 335 via the S1-MME interface 380 in, for example, WTRU-associated signaling messages. The MME 335 may use the information from the HeNB 320 to override the normal L-GW 325 selection algorithm. The S-GW 340 may communicate with the P-GW 365 over an S5 interface 370. The S-GW 340 may communicate with the MME 335 over an S11 interface 390.

Figure 4:
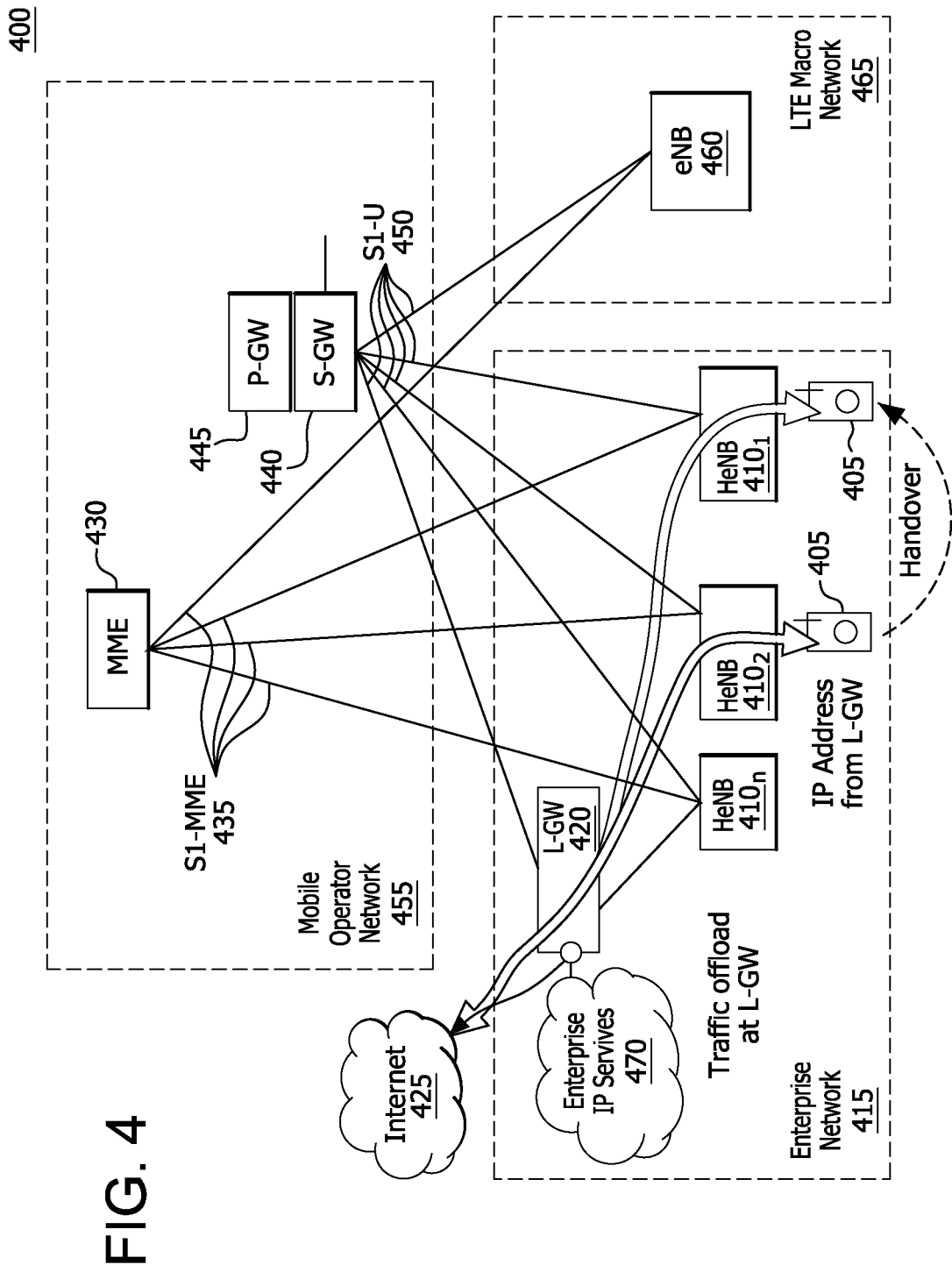
FIG. 4 shows an example of a wireless network configured to perform SIPTO or LIPA services.

FIG. 4 shows an example of a wireless network 400 configured to perform SIPTO or LIPA services. A WTRU 405 may communicate with one of a plurality of HeNBs $410_{1...n}$. The WTRU 405 and the plurality of HeNBs $410_{1...n}$ may be located at an Enterprise Network 415. A L-GW 420 is also located at the Enterprise Network 415. Each of the HeNBs $410_{1...n}$ may be in communication with the L-GW 420. The L-GW 420 may also be in communication with the Internet 425. Each of the HeNBs $410_{1...n}$ may be in communication with an MME 430 over an S1-MME interface 435. Each of the HeNBs $410_{1...n}$ may also be in communication with a S-GW 440 and a P-GW 445 over an S1-U interface 450. The S-GW 440 and the P-GW 445 may be collocated. The MME 430, the S-GW 440, and the P-GW 445 may be located at a Mobile Operator Network 455. An eNB 460 may be in communication with the MME 430 over an S1-MME interface 435 and may be in communication with the S-GW 440 and P-GW 445 over an S1-U interface 450. The eNB 460 may be located at an LTE Macro Network 465.

Traffic offload may be performed at the L-GW 420. In addition to being in communication with the Internet 425, the L-GW 420 may be in communication with Enterprise IP Services 470. The traffic offload may be performed from the WTRU 405 through the HeNBs $410_{1...n}$ and the L-GW 420 to the Internet 425. As shown in FIG. 4, the WTRU 405 may handover from one HeNB $410_2$ to another HeNB $410_1$ and may continue to perform traffic offload via the L-GW 420.

As shown in FIG. 4, a HeNB subsystem may support SIPTO to provide access from the WTRU 405 connected via a HeNB $410_{1...n}$ via HeNB radio access to a network, such as the Internet 425. SIPTO may be performed without traversing the Mobile Operator Network 455. A mobile operator or a HeNB hosting party may enable or disable SIPTO on a HeNB-by-HeNB basis. Based on SIPTO policies set by, for example, the mobile operator, the network may be able to allow a user of the WTRU 405 to accept or decline offload before traffic is offloaded. SIPTO policies may be defined per APN, per IP Flow class under any APN, or per IP Flow class under a specific APN. The mobile operator may configure the SIPTO policies either statically or dynamically.

As shown in FIG. 4, the WTRU 405, in communication with at least one HeNB $410_{1...n}$, may have a LIPA connection that provides an IP connection to the Enterprise IP Services 470. The WTRU 405 may also have a SIPTO connection that is offloaded at a RAN, via the L-GW 420, to the Internet 425. Thus, in FIG. 4, the L-GW 420 is at the RAN and is standalone. Therefore, in this example, SIPTO for use with the HeNB subsystem may be offloading IP traffic from the HeNB subsystem to the Internet. Thus, SIPTO service may be "closer" to the WTRU because it is available at the RAN. In other examples, traffic offload may be available beyond the RAN.

Methods and apparatus are described for enabling user indications and responses with respect to SIPTO or LIPA services. Due to the similarities between SIPTO and LIPA services, the methods and apparatus described herein are applicable to both SIPTO and LIPA services. One skilled in the art will recognize that any references to SIPTO or LIPA may similarly apply to the other service type. Similarly, the examples used herein apply to any network, system, or technology. For example, the examples are applicable to at least LTE and UTRAN systems.

A user may wish to indicate a preference with respect to the use of SIPTO or LIPA services. For example, a user may indicate a preference that SIPTO and LIPA are never used. As another example, a user may indicate that using SIPTO and LIPA is always allowed. Further, a user may indicate a preference to use SIPTO or LIPA in particular situations. A user may also indicate a desire to switch from SIPTO/LIPA services to non-SIPTO/LIPA services. A user may also indicate a preference according to one or a combination of the following examples.

Figure 5:
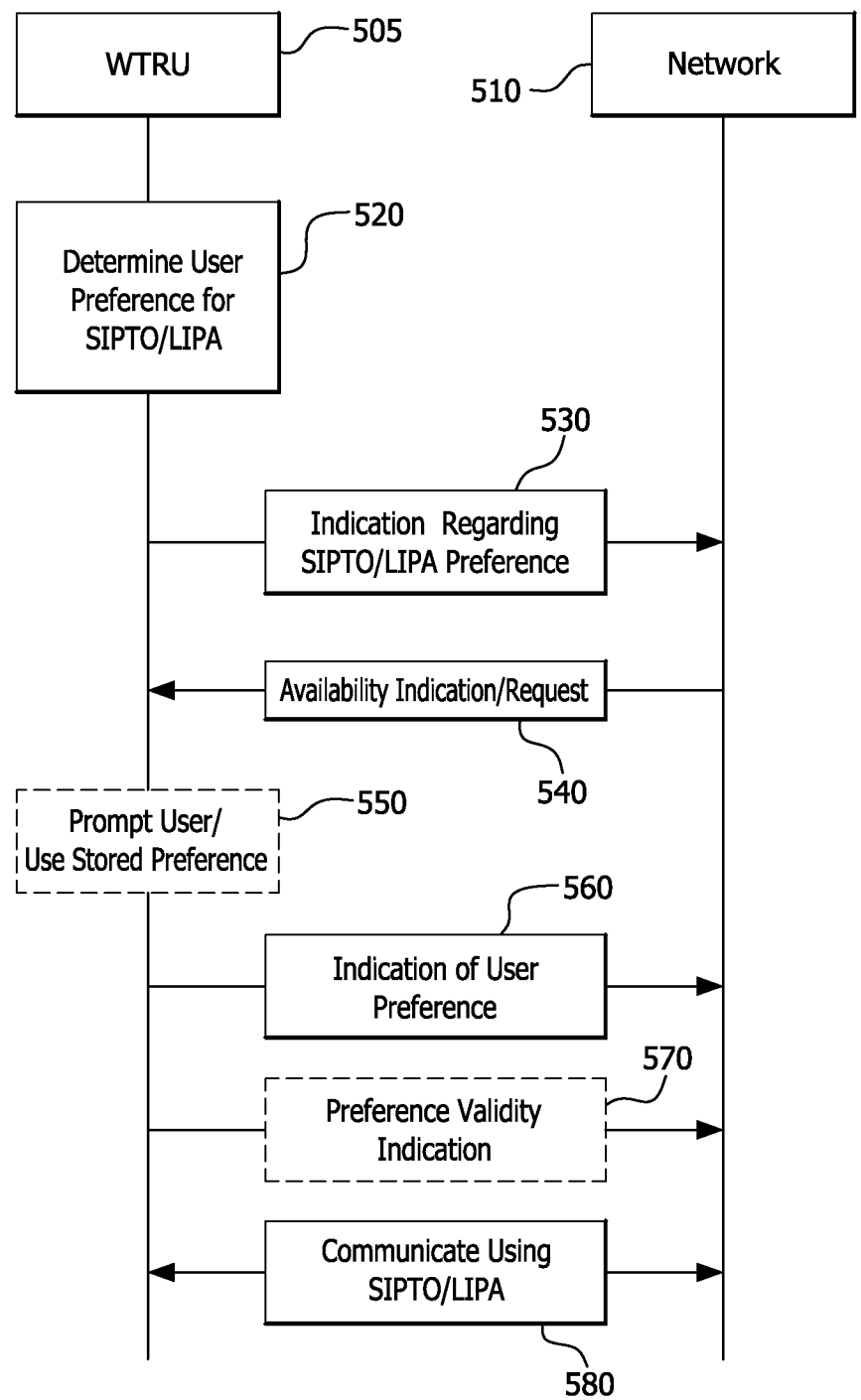
FIG. 5 is an example call flow diagram for indicating a SIPTO/LIPA preference.

FIG. 5 is an example call flow diagram 500 for indicating a SIPTO/LIPA preference. The call flow diagram 500 includes a WTRU 505 and a network 510. The WTRU 505 may determine 520 a user preference regarding SIPTO/LIPA service. For example, a user preference regarding the use of SIPTO/LIPA services may be already configured in the WTRU 505 or may be stored in the WTRU 505. For example, a user may manually select preferences for the WTRU 505 via, for example, a graphical user interface. The graphical user interface (for example, a connection manager) may include icons that the user can select (for example, via one click) to indicate preferences. One or more of the icons may be programmed to represent SIPTO, one or more icons may be programmed to represent LIPA, and/or other icons may be programmed to represent any other type of connections or services. Based on the preferences indicated by the user, the WTRU 505 may indicate its preference for SIPTO/LIPA services. For example, the WTRU may transmit an indication 530 to a network regarding the user preference. The indication 530 may be transmitted even if no SIPTO/LIPA service is currently available for the WTRU 505. The unavailability of SIPTO/LIPA service may be based on, for example, the current location of the WTRU 505. The WTRU 505 may transmit the indication 530 in some or all NAS messages that the WTRU 505 transmits to the network 510. For example, the WTRU 505 may transmit the indication 530 in an Attach message, a Tracking Area Update (TAU) message, a Routing Area Update (RAU) message, and/or a Location Area Update (LAU) message. The WTRU 505 may also transmit the indication 530 in session management messages. For example, the WTRU 505 may transmit the indication 530 in a PDN Connectivity Request message or an Activate PDP Context Request message. Alternatively or additionally, the WTRU 505 may transmit a preference indicated by the user to the network 510 if the network 510 requests such information from the WTRU. For example, if the network and a given connection are capable of providing SIPTO/LIPA services, the network 510 may transmit an availability indication/request 540 to the WTRU 505 indicating the availability of SIPTO/LIPA services and/or requesting a preference for SIPTO/LIPA services from the WTRU 505. The WTRU 505 may prompt the user for a preference or may use a previously stored or selected preference 550. The WTRU 505 may transmit an indication of the user preference 560 based on the user preference, which may have been recently received or already stored in the WTRU 505.

The user preferences may indicate a variety of preferences regarding SIPTO/LIPA services. For example, a user preference may indicate "Always Accept SIPTO/LIPA Connection." The "Always Accept SIPTO/LIPA Connection" user preference may indicate that if the network 510 transmits the availability indication/request 540 for SIPTO/LIPA services to the WTRU 505, the WTRU 505 may transmit an "accept" indication in the indication of the user preference 560 transmitted to the network 510. The WTRU 505 may transmit the "accept" indication without prompting the user for a particular preference. Another example of a user preference is a "Reject all SIPTO/LIPA Connections" preference. The "Reject all SIPTO/LIPA Connections" user preference may indicate that if the network 510 transmits the availability indication/request 540 for SIPTO/LIPA services to the WTRU 505, the WTRU 505 may transmit a "decline" indication in the indication of the user preference 560 transmitted to the network 510. The WTRU 505 may transmit the "decline" indication without prompting the user for a particular preference. Another example of a user preference is an "Always Ask" preference. The "Always Ask" user preference may indicate that if the network 510 transmits the availability indication/request 540 for SIPTO/LIPA services to the WTRU 505, the WTRU 505 may prompt the user for a specific preference with respect to the SIPTO/LIPA services. This may be performed, for example, via a graphical user interface and/or a pop-up message. The pop-up message may include a special icon linked (for example, by a configuration option or natively programmed) to a specific service, such as, for example, SIPTO or LIPA. The user may indicate whether to accept or decline the particular SIPTO/LIPA services. Based on the user indication, the WTRU may transmit an "accept" or "decline" indication in the indication of the user preference 560 transmitted to the network 510.

Alternatively or additionally, the WTRU 505 may transmit an indication to the network 510 that includes a "preference validity period" parameter 570. The "preference validity period" parameter 570 may indicate to the network 510 details with respect to how to maintain the SIPTO/LIPA preference that the WTRU 505 had previously indicated. The "preference validity period" parameter 570 may include a value indicating how long a particular user preference may be valid. For example, the "preference validity period" parameter 570 may include a "semi-permanent" value or a "dynamic" value. The "semi-permanent" value may indicate that the chosen preference (for example, allowing SIPTO/LIPA services or not allowing SIPTO/LIPA services) lasts until the indication is received that includes a "preference validity period" parameter with a different value than the current value. The "dynamic" value may indicate that the network may request a new indication with respect to each available SIPTO/LIPA service. For example, this may be similar to and used in conjunction with the "Always Ask" user preference. As an example, the WTRU 505 may transmit the "preference validity period" parameter 570 in EPS Mobility Management (EMM) messages. If the WTRU 505 does not include a "preference validity period" parameter 510 in a message (for example, an initial ATTACH message), the network may use a value related to the WTRU's SIPTO/LIPA subscription or the network may choose a default value such as the "semi-permanent" value. The WTRU 505 may communicate with the network 510 using a SIPTO/LIPA service 580.

The features recited in FIG. 5 may be performed in any combination and in any order. Similarly, the names associated with the indications, messages, and features are for purposes of example.

Figure 6:
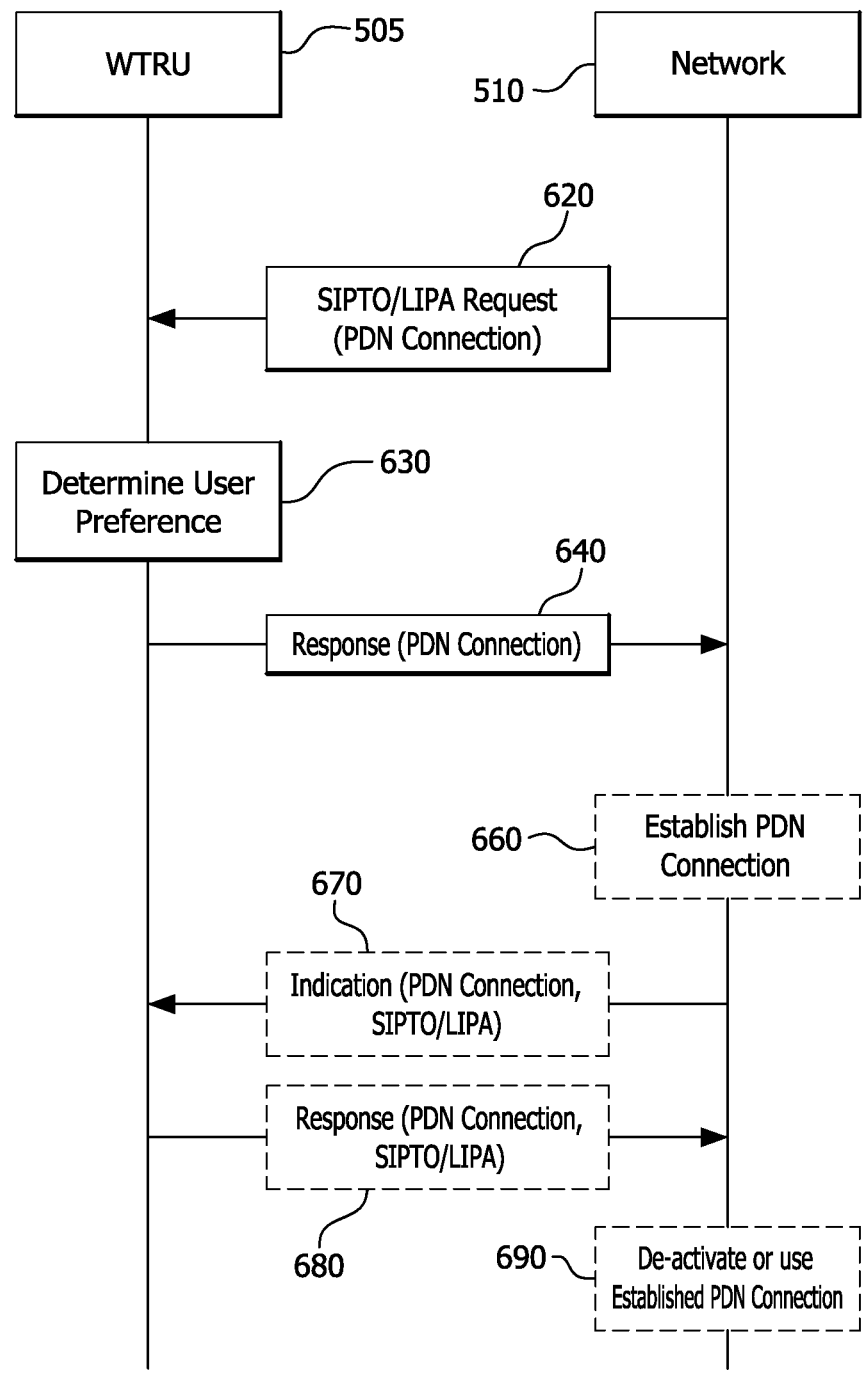
FIG. 6 is an example call flow diagram for indicating a SIPTO/LIPA preference with respect to one or more PDN connections.

FIG. 6 is an example call flow diagram 600 for indicating a SIPTO/LIPA preference with respect to one or more PDN connections. The call flow diagram 600 includes the WTRU 505 and the network 510. Alternatively or in addition to other examples described herein, the network 510 may transmit a request 620 to the WTRU 505 to accept or decline SIPTO/LIPA services for a particular PDN connection. The request 620 may be transmitted upon the initiation of each PDN connection request that is subject to SIPTO/LIPA. Thus, along with or in addition to a request for a PDN connection, the network 510 may request an indication as to whether the PDN connection to SIPTO/LIPA is acceptable. The network 510 may transmit this request in, for example, a new NAS message or an existing NAS message. The WTRU 505 may prompt the user for a preference 630 regarding the PDN connection. The WTRU 505 may transmit an indication or a response 640 to the network based on the user preference. Therefore, the WTRU 505 response 640 based on a user preference may be considered during the setup of the PDN connection.

As an example, in an LTE network, a PDN connection may be initiated if the WTRU 505 transmits a PDN Connectivity Request message and the network 510 responds with an Activate Default EPS Bearer Context Request message. Accordingly, the network 510 may include an indication to request 620 the user to accept or reject having a particular PDN connection use SIPTO/LIPA services in the Activate Default EPS Bearer Context Request message. Similarly, the network 510 may include information regarding whether the PDN connection is providing SIPTO and/or LIPA, or both. As an example, this may be achieved by including, in any message, a defined information element (IE) that may indicate that a response 640 from the WTRU 505 is required. For example, the response 640 from the WTRU 505 may indicate whether the user accepts, declines, or is indifferent with respect to the PDN connection that uses SIPTO and/or LIPA services. If the WTRU 505 is pre-configured with a user preference (as described in detail above), then the WTRU 505 may use this configuration and may provide a response 640 to the network regarding the current preference. The WTRU 505 may also prompt the user for a preference regarding a PDN connection each time the WTRU 505 receives the indication or request 620 from the network 510 requesting the WTRU 505 to accept or reject having the particular PDN connection be subject to SIPTO/LIPA services.

If the WTRU 505 is pre-configured with a user preference, then the establishment of the PDN connection may operate according to any procedure and may operate without a notification to the user. If the WTRU 505 requests the user's preference 530 in response to the request 620 from the network 510, then the WTRU 505 may not respond to the request 620 from the network until receiving the user preference 630. Thus, the WTRU 505 may prompt the user to accept or reject that the PDN connection is subject to SIPTO/LIPA. The WTRU 505 may transmit the response 640 to the network 510 in response to the request 620 from the network 510. The response 640 may be included in a response session management message including, for example, an Activate Default EPS Bearer Context Accept message or an Activate Default EPS Bearer Context Reject message.

The response 640 transmitted by the WTRU 505 may be based on a preference 630 indicated by the user. Alternatively or additionally, the response 640 transmitted by the WTRU 505 may be based on preferences 630 currently stored in the WTRU. Therefore, the response 640 transmitted by the WTRU 505 may indicate that SIPTO/LIPA service is accepted (based on a user preference indicated by the user for that request) or acceptable (based on user preferences currently stored in the WTRU 505). The WTRU 505 may transmit the response 640 that is an accept message. The WTRU 505 may include an indication that the user accepted the service that is subject to SIPTO or LIPA. For example, a new IE may be defined. The value of the IE may indicate whether or not SIPTO, LIPA, or both are accepted based on the user preference. The new IE may be, for example, a User Service Preference IE. Alternatively, the WTRU 505 may transmit the response 640 that is a reject message if the user preference 630 (or WTRU's current settings) indicates that SIPTO, LIPA, or both are not acceptable. Also, the WTRU 505 may send the response 640 that is an accept message with an indication that SIPTO/LIPA service is not desired. The network 510 may use the provided IP address and the particular APN, but the network 510 may re-establish the necessary context with another PDN GW that does not provide SIPTO/LIPA services. However, the PDN GW may share the same APN.

If the WTRU 505 prompts the user for a preference 630, the WTRU 505 may use a timer, for example, to set a time limit on receiving a response from the user. The timer may be started when the WTRU 505 receives the request 620 from the network regarding whether to accept or decline SIPTO/LIPA services. Optionally, the timer may be used if the WTRU 505 uses preferences 630 stored in the WTRU 505. The value of the timer may be preconfigured in the WTRU 505 or may be signaled to the WTRU 505 by the network 510. If the timer expires without the user providing an input to the WTRU 505 or if the pre-configured, stored preferences cannot be retrieved by the WTRU 505, then the WTRU 505 may transmit the response 640 with either an accept indication or a reject indication. The WTRU 505 may be pre-configured to respond with either the accept indication or the reject indication. The pre-configuration may be based on a user preference, may be pre-determined at the WTRU 505, or may be signaled to the WTRU 505 by the network 510. The response 640 may include a further indication that a preference 630 was not received from the user, therefore indicating that the accept indication or reject indication was generated by the WTRU 505 without a user input. Alternatively, the WTRU 505 may transmit the response 640 with an indication that there is no preference regarding accepting or declining SIPTO/LIPA services. Therefore, the network 510 may be allowed to decide whether or not SIPTO/LIPA services should be allowed for the PDN connection.

If the response 640 transmitted by the WTRU 505 indicates that the PDN connection is rejected, another PDN connection procedure may be initiated, optionally without indicating a failure of the PDN connection procedure. Similarly, another PDN connection procedure may be initiated without failing the current attach procedure if this PDN connection attempt is being performed as a part of the attach procedure.

Alternatively or additionally, a PDN connection may first be established 660 regardless of whether it is subject to SIPTO/LIPA. Further, the PDN connection may be established 660 without requesting a user preference from the WTRU 505. Once the PDN connection is established 660, the network 510 may transmit an indication 670 to the WTRU 505 indicating that the existing PDN connection is subject to SIPTO/LIPA services. The indication 670 may include a request for a user preference regarding the established connection that is subject to SIPTO/LIPA services. As an example, in an LTE network, the PDN connection procedure may be performed during an Attach procedure. If the PDN connection fails, then the Attach procedure may also fail. In this way, a timer may also be used upon transmitting the indication 670 to the WTRU 505. If the WTRU 505 does not respond within a predetermined time, the Attach procedure may fail.

The indication 670 transmitted to the WTRU 505 indicating that the existing PDN connection is subject to SIPTO/LIPA services may be included in, for example, an existing NAS message, such as for example, an EMM Information message. The WTRU 505 may transmit a response 680 to the indication 670 transmitted by the network 510. The response 680 may indicate acceptance or rejection of the SIPTO/LIPA services according to any of the methods described herein. For example, the response 680 may be included in a new NAS message that may be transmitted to the network. If the WTRU 505 transmits a response 680 indicating that the user accepts the PDN connection, the network 510 may continue to use 690 the established PDN connection. If the WTRU 505 does not accept (based on user preference or otherwise) that the PDN connection is subject to SIPTO or LIPA, then the network 510 may deactivate 690 the established PDN connection. The WTRU 505 may not deactivate the already established PDN connection until another PDN connection is established.

In another example, the request 620 transmitted by the WTRU 505 may be an indication with respect to all APNs that are capable of providing SIPTO or LIPA service. Alternatively or additionally, the WTRU 505 may prompt the user 630 to accept or decline SIPTO/LIPA services based on an APN. For example, the WTRU 505 may prompt the user 630 for some APNs, while not prompting the user 630 for other APNs. Thus, for example, if the WTRU 505 uses stored settings that were previously stored based on user preferences to accept or decline SIPTO/LIPA service, the response 640 to the network 510 may be based on the APN that is providing SIPTO/LIPA. Information with respect to APNs may be provided to the user. For example, if the WTRU 505 prompts a user to accept or reject SIPTO/LIPA services, the WTRU 505 may also indicate which APN is providing the SIPTO/LIPA service. For example, the WTRU 505 may provide this information to the user in a manner that is understood by the user, such as an APN name that may be known to be related to a domain name. As another example, if the WTRU 505 indicates in a response 640 to the network 510 that SIPTO/LIPA services are not desirable for a particular APN (for example, APN1), then the network 510 may not request 620 an indication from the WTRU 505 for other APNs that are not identified as APN1. For example, the network 510 may receive an indication or be pre-configured to know that a WTRU 505 indication with respect to APN1 may be applicable to other APNs or all APNs. This may occur, for example, during an Attach procedure.

The network 510 may configure the WTRU 505 to either require a user preference/input with respect to accepting or declining SIPTO/LIPA services or the network 510 may configure the WTRU 505 to not require a user preference/input. For example, the network 510 may configure the WTRU 505 via an Open Mobile Alliance (OMA) Device Management (DM) message or an over-the-air (OTA) message. The network 510 may also provide a configuration to the WTRU 505 in one or all NAS messages or a new NAS message may be defined. The network 510 may also provide a configuration to the WTRU 505 via a RRC message. The configuration may be forwarded to the NAS. For example, during an Attach procedure, the network 510 may indicate, for example via an information element, whether or not a user input/preference is requested for accepting or declining SIPTO/LIPA. The WTRU 505 may provide this indication to the user based on the configuration received from the network 510. Similarly, the WTRU 505 may not provide an indication to the user if a user input or preference is not requested.

If the WTRU 505 is in communication with a visited Public Land Mobile Network (PLMN) (VPLMN), then the VPLMN may contact a home PLMN (HPLMN) to retrieve the HPLMN's policy with respect to whether a SIPTO/LIPA service is subject to user preference. If the VPLMN receives policy information from the HPLMN, the VPLMN may configure the WTRU accordingly. For example, the VPLMN may configure the WTRU 505 to either start or stop requesting user input/preferences to accept or decline SIPTO/LIPA service.

CSG lists (such as, for example, Operator or Allowed CSG lists or the WTRU's whitelist) may include indications that relate to whether a CSG or a plurality of CSGs provide SIPTO/LIPA service. Accordingly, a manual selection of a CSG that is configured to support SIPTO/LIPA service may imply an acceptance of SIPTO/LIPA by the user. The user may also configure the WTRU 505 (for example, either statically or on a real-time basis) to only consider SIPTO/LIPA-capable CSGs for autonomous CSG selection. Similarly, the user may configure the WTRU 505 (for example, either statically or on a real-time basis) to exclude SIPTO/LIPA-capable CSGs from autonomous CSG selection. Such configuration can be considered as an implicit acceptance or implicit rejection of SIPTO/LIPA. Configuration of the WTRU 505 to perform selective autonomous CSG cell selection may be applied to other services and may not be limited to SIPTO/LIPA services.

The network 510 may also provide an indication to the WTRU 505 that the service provided by the PDN connection that is to be established may cause degradation of the quality of service. This indication may be included in any of the messages or indications described herein or may be transmitted separately. The degradation in quality of service may be due to the use of SIPTO/LIPA services. The indication regarding the expected quality of service may be used by the WTRU 505 or user to make a decision. For example, this decision may be to either accept or decline SIPTO/LIPA or any other service.

The network 510 may transmit one or more IP addresses to the WTRU 505 that may correspond to different APNs. The one or more IP addresses may also correspond to a particular APN. For example, the IP addresses may be included in existing session management messages. The WTRU 505 may choose the appropriate IP address that maps to an APN that satisfies a user request, preference, or input to accept or decline SIPTO/LIPA service. This may be performed after requesting the user to accept or decline SIPTO/LIPA service. For example, if the user indicates that SIPTO/LIPA service is not accepted, then the WTRU 505 may indicate, to the network, a selection of an IP address and APN that do not provide SIPTO/LIPA service. This indication may be included, for example, in the response 680 message that may be sent to the network.

If the only available PDN connection is subject to SIPTO/LIPA service and the user or WTRU 505 has rejected that PDN connection a pre-determined number of times, then the network 510 may limit the number of subsequent PDN connection requests that may be transmitted from the WTRU 505. This limit may be configured in the WTRU 505 or signaled to the WTRU 505 by the network 510, for example, via a NAS message. If the WTRU 505 has rejected the same PDN connection the pre-determined number of times, the WTRU 505 may start a timer. The WTRU 505 may not transmit any PDN connection requests until the timer expires. Similarly, the WTRU 505 may not transmit any PDN connection requests until the WTRU 505 prompts the user for further SIPTO/LIPA preferences or changes. Further, the WTRU 505 may transmit another PDN connection request if an emergency call needs to be made that requires a PDN connection. The network 510 may configure or change the WTRU 505 settings such that the user is not given a preference or choice, thereby ensuring the success of subsequent PDN connections even if the PDN connection is subject to SIPTO/LIPA services.

If there is an emergency call while the network 510 is in the process of indicating SIPTO services to the WTRU 505, the process may be automatically canceled. The process may be resumed at the end of the emergency call. Alternatively, the process may not be resumed during the lifetime of the PDN connection used for the emergency service. This may be because a caller may receive, or be waiting for, a return call from the emergency service provider.

The features recited in FIG. 6 may be performed in any combination and in any order. Similarly, the names associated with the indications, messages, and features are for purposes of example.

A WTRU 505 or user that is using SIPTO or LIPA services may desire, request, or need to revert back to non-SIPTO/LIPA traffic. For example, the WTRU 505 or user may realize that the performance of the WTRU 505 using SIPTO or LIPA does not meet the WTRU 505 or user's expectation. Any of the following examples may be used in any combination to revert back to non-SIPTO/LIPA traffic or service.

Figure 7:
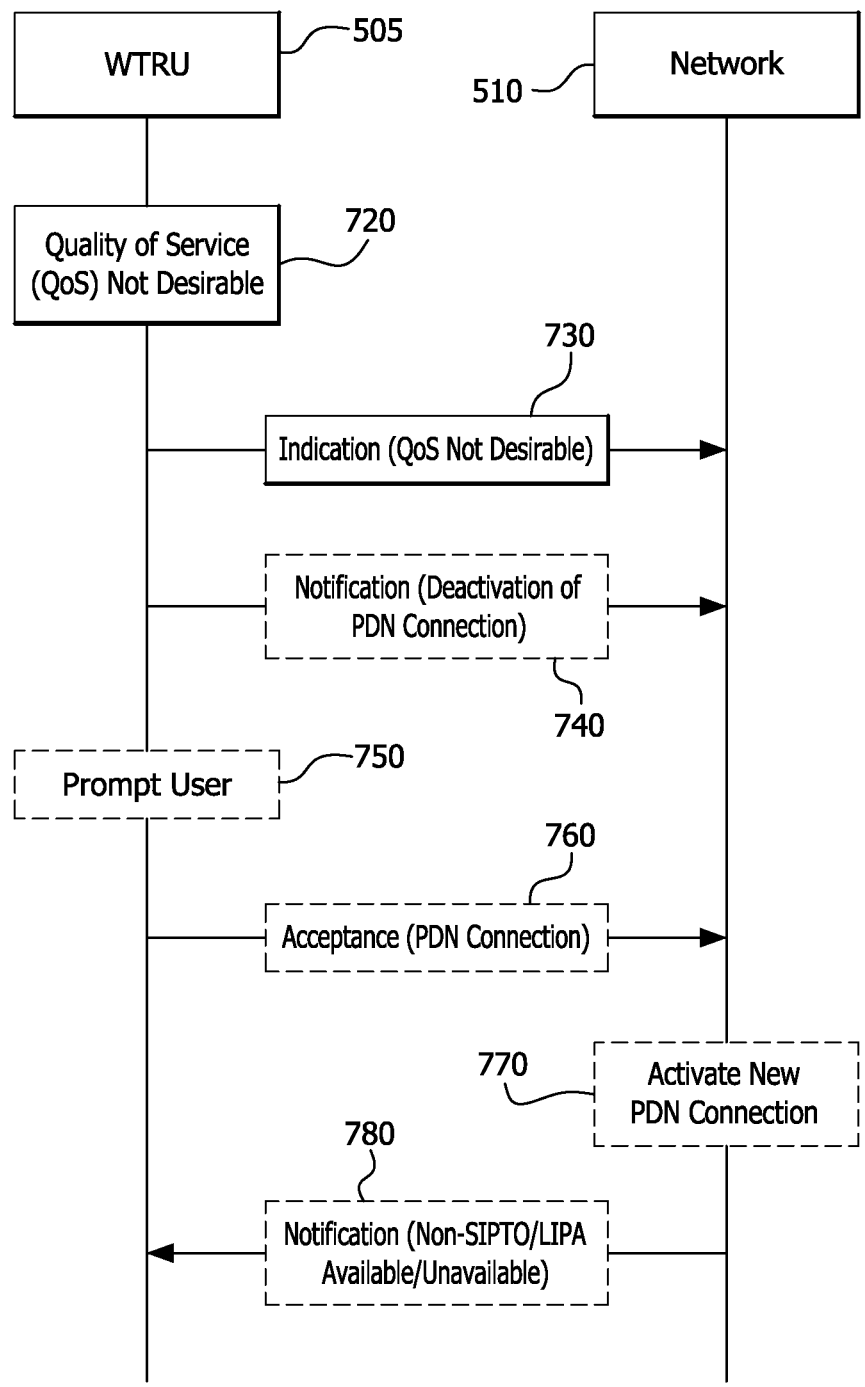
FIG. 7 is an example call flow diagram of an exemplary process for indicating that quality of service of a connection is not desirable using SIPTO/LIPA.

FIG. 7 is an example call flow diagram of an exemplary process 700 for indicating that quality of service for a connection is not desirable using SIPTO/LIPA. The WTRU 505 may determine 720 that quality of service for a connection is not desirable. The WTRU 505 may transmit an indication 730 to the network 510 to notify the network 510 that the quality of service is not desirable. For example, this indication 730 may be included in an existing NAS message or a new NAS message. The indication 730 may be triggered by user interaction. For example, if the user does not prefer the current performance of services at the WTRU 505, the user may change one or more settings in the WTRU 505. This may be performed, for example, via a user interface. The action or indication performed by the user may trigger the WTRU 505 to transmit the indication 730 to the network 510.

The indication 730 transmitted to the network 510 may result in the deactivation of the current PDN connection. The indication 730 may also trigger the network 510 to notify 740 the WTRU 505 or user that the indication 730 may result in the deactivation of the PDN connection. The user may be prompted 750 by the WTRU 505 and may provide consent to the deactivation of the PDN connection. The WTRU 505 may transmit an acceptance 760 of the deactivation of the current PDN connection to the network 510. The network 510 may attempt to activate 770 another PDN connection, for example, according to any of the examples described herein.

The indication 730 transmitted by the WTRU 505 may be in the form of a new NAS message, for example, a session management message. The indication 730 may also be included in an existing NAS message, such as, for example, a PDP Context Modification Request message or an EPS Bearer Context Modification Request message. Any of these messages may include a new IE that may indicate that the user's performance via the current PDN connection is degraded or unacceptable. The indication 730 transmitted by the WTRU 505 may be used with respect to any service and is not necessarily limited to SIPTO/LIPA services. Based on the indication 730, the network 510 may activate a new PDN connection or re-activate another PDN connection, either directly or upon the next WTRU 505 transition to idle mode.

If the existing PDN connection needs to be deactivated, the WTRU 505 may include, in the indication 730, a further indication that the reason for the notification and/or deactivation is the degradation of the quality of service. The network 510 may consider this reason and, if possible, may not offload further traffic or may use other PDN connections.

The network 510 may transmit a notification 780 to the WTRU 505 regarding whether or not it is possible to revert back to non-SIPTO or non-LIPA traffic. If the network 510 cannot revert back to non-SIPTO or non-LIPA traffic, the WTRU 505 may stop sending the indication 730 to the network 510, for example, even if the user triggers the indication as described above. The WTRU 505 may stop sending the indication 730 for a pre-determined period of time. The WTRU 505 may notify the user that the traffic cannot be reverted. For example, the WTRU 505 may display a message to the user. The network 510 may not revert back to non-SIPTO or non-LIPA traffic if the WTRU 505 has an existing PDN connection for an emergency service. In this way, the network 510 may prevent a failure or interruption to the PDN connection used for emergency services.

The WTRU 505 and the network 510 may transition from SIPTO/LIPA service to non-SIPTO/LIPA service using mobile IP. Using mobile IP may allow the WTRU 505 to transition without much interruption. One or more of the following examples may be used to transition from SIPTO/LIPA service to non-SIPTO/LIPA.

As described above, the response 640 transmitted from the WTRU 505 to the network 510 regarding acceptance or rejection of SIPTO/LIPA service may be applicable to all APNs that provide SIPTO or LIPA service. Similarly, the user preference and the WTRU 505 response 640 to accept or decline SIPTO service according to any of the examples described herein may be applicable to all APNs that provide SIPTO or LIPA service. If the user desires to revert back to non-SIPTO/LIPA service, the user may indicate this preference to the WTRU 505 and the WTRU 505 may transmit an indication to the network. The indication may include the preference and the network may activate a second PDN/PDP connection with the P-GW. The L-GW may use a newly assigned global IP address to update the IP address binding at a foreign IP network. The foreign IP network may acknowledge the IP binding change and the foreign IP network may begin to forward packets to the P-GW. The P-GW may receive the binding update acknowledgement. The P-GW may trigger the MME to release the WTRU's SIPTO connection. The WTRU 505 may release the SIPTO PDN connection or the WTRU 505 may not release the SIPTO PDN connection and may keep the connection, for example, in the event of high latency traffic.

The features recited in FIG. 7 may be performed in any combination and in any order. Similarly, the names associated with the indications, messages, and features are for purposes of example.

Any of the following services or examples may be used alone or in combination with any of the examples described herein. An APN may be mapped to a specific L-GW or a set of L-GWs. Similarly, a L-GW may support several APNs. Radio bearers, such as E-RABs and RABs, may be mapped on a real-time basis to a SIPTO gateway or a non-SIPTO gateway. The WTRU 505 or user may receive an indication for each CSG or L-GW regarding the service level for that CSG or L-GW. For example, the service level may be identified as "premium," "guaranty service," or "basic/non guaranty service" with a pricing tag. The user or WTRU may dynamically switch between each service level.

A network 510 that sets up a SIPTO connection for a WTRU 505 to offload traffic may configure an IP-level performance measurement on the L-GW. The performance measurement may be used, for example, to monitor the packet delay and/or any other performance indicators with respect to the WTRU's traffic. The performance measurement may be configured on a per-APN basis. The network may configure one or more criteria to trigger the transition from SIPTO to non-SIPTO service for the WTRU's traffic or the per-APN traffic. The same may be applicable to LIPA services.

If a WTRU 505 indicates in a registration message (for example, a TAU) that all of the active bearers in the WTRU 505 (for example, EPS bearer contexts) have been deactivated (for example, via the EPS bearer context status IE), the network 510 may reject the registration message if the WTRU 505 does not have any other active bearer, PDP context, or PDN connection. The network 510 may indicate via, for example, a reject message, that the WTRU 505 must re-attach to the system. The WTRU 505 may also initiate an attach procedure if there is no other active EPS bearer and the WTRU 505 does not have any other PDN connection. The WTRU 505 and/or the network 510 may initiate the activation of another PDN connection instead of re-attaching to the system.

A user may provide a preference, input, or indication to the WTRU 505 in any manner. For example, a WTRU 505 may prompt a user for a preference regarding SIPTO/LIPA service as described in detail above. The prompt may be an indication on the WTRU 505 that allows a response from the user. For example, a user may click or otherwise select a particular option on a screen of the WTRU 505. A user may have a pre-configured selection or preference stored in the WTRU 505 and the WTRU 505 may allow a user to choose the selection or preference with, for example, a single click. This may occur for each call and may occur at the time of a particular. For example, one or more preferences or profiles may be stored in the WTRU 505. At the time of the particular service offering, a WTRU 505 may prompt a user to select a particular preference or profile to be used for that service. For example, if the service is a call, a user may desire better quality and may select not to use SIPTO/LIPA services. As another example, the service may be a request to the Internet and the user may allow SIPTO/LIPA services.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer. Although examples are described with respect to a WTRU and/or a user, one of ordinary skill in the art will appreciate that either the WTRU or a user may perform the features or elements described in the examples.

What is claimed is:

1. A method for use in a wireless transmit/receive unit (WTRU), the method comprising:
   receiving a packet data network (PDN) connection request from a network, the PDN connection request identifying a PDN connection that is using Selected Internet Protocol (IP) Traffic Offload (SIPTO) or Local IP Access (LIPA) services;
   receiving an indication based on a preference for using SIPTO or LIPA;
   transmitting a message to the network, the message indicating a preference regarding the PDN connection that is using SIPTO or LIPA services, wherein the message includes at least a validity period associated with the indication; and
   transmitting a request to the network, the request requesting the network to establish a new PDN connection that is not using SIPTO or LIPA services.

2. The method of claim 1, wherein the PDN connection is established prior to receiving the PDN connection request.

3. The method of claim 2, wherein the message further indicates whether to maintain or deactivate the PDN connection based on the preference.

4. The method of claim 1, wherein the preference is based on user input received each time the PDN connection request is received.

5. The method of claim 1, further comprising:
   storing, at the WTRU, a pre-configured preference for using the SIPTO or LIPA services,
   wherein the preference indicated in the message is based on the pre-configured preference.

6. The method of claim 1, further comprising:
   receiving a non access stratum (NAS) message that indicates that the PDN connection is using SIPTO or LIPA services.

7. The method of claim 1, wherein the transmitting the request is performed in response to determining, at the WTRU, that the quality of service of the PDN connection is below a pre-determined threshold.

8. The method of claim 1, wherein the transmitting the request is performed in response to a user input received at the WTRU.

9. A wireless transmit/receive unit (WTRU) comprising:
   a receiver configured to receive a packet data network (PDN) connection request from a network, the PDN connection request identifying a PDN connection that is using Selected Internet Protocol (IP) Traffic Offload (SIPTO) or Local IP Access (LIPA) services and to receive an indication based on a preference for using SIPTO or LIPA ; and
   a transmitter configured to transmit a message to the network, the message indicating a preference regarding the PDN connection that is using SIPTO or LIPA services, wherein the message includes at least a validity period associated with the indication and a request to the network, the request requesting the network to establish a new PDN connection that is not using SIPTO or LIPA services.

10. The WTRU of claim 9, wherein the preference is based on a value stored at the WTRU.

11. The WTRU of claim 9, wherein the preference is based on user input received each time the PDN connection request is received from the network.

* * * * *